(12) United States Patent
McMahon et al.

(10) Patent No.: US 7,265,656 B2
(45) Date of Patent: Sep. 4, 2007

(54) VEHICLE IMAGING SYSTEM

(75) Inventors: Martha A McMahon, Ann Arbor, MI (US); Robert L Bingle, Holland, MI (US)

(73) Assignee: Donnelly Corporation, Holland, MI (US)

( * ) Notice: Subject to any disclaimer, the term of this patent is extended or adjusted under 35 U.S.C. 154(b) by 12 days.

(21) Appl. No.: 11/361,383

(22) Filed: Feb. 24, 2006

(65) Prior Publication Data

US 2006/0145826 A1 Jul. 6, 2006

Related U.S. Application Data

(63) Continuation of application No. 10/418,486, filed on Apr. 18, 2003, now Pat. No. 7,005,974.

(60) Provisional application No. 60/376,508, filed on Apr. 30, 2002, provisional application No. 60/373,932, filed on Apr. 19, 2002.

(51) Int. Cl.
*B60Q 1/00* (2006.01)

(52) U.S. Cl. ............... 340/435; 340/436; 340/937; 701/28

(58) Field of Classification Search ............... 340/435, 340/436, 438, 441, 443, 444, 988–994, 431–434, 340/471, 472, 425.5, 937, 933, 870.01; 701/1, 701/23, 28, 301, 300
See application file for complete search history.

(56) References Cited

U.S. PATENT DOCUMENTS

| | | | |
|---|---|---|---|
| 3,947,095 A | 3/1976 | Moultrie | 350/302 |
| 4,214,266 A | 7/1980 | Myers | 358/108 |
| 4,277,804 A | 7/1981 | Robison | 358/108 |
| 4,405,943 A * | 9/1983 | Kanaly | 375/240.08 |
| 4,626,850 A | 12/1986 | Chey | 340/903 |
| 4,892,345 A | 1/1990 | Rachael, III | 296/24.1 |
| 4,937,796 A | 6/1990 | Tendler | 367/116 |
| 5,121,200 A | 6/1992 | Choi | 358/103 |
| 5,249,027 A * | 9/1993 | Mathur et al. | 356/3.14 |
| 5,406,395 A | 4/1995 | Wilson et al. | 359/15 |
| 5,414,461 A | 5/1995 | Kishi et al. | 348/115 |

(Continued)

FOREIGN PATENT DOCUMENTS

DE        2931368 A1    8/1979

(Continued)

*Primary Examiner*—Daniel Wu
*Assistant Examiner*—Daniel Previl
(74) *Attorney, Agent, or Firm*—VanDyke, Gardner, Linn & Burkhart, LLP

(57) ABSTRACT

A vehicle imaging system includes an imaging sensor, an imaging sensor bracket and an image processor. A vehicle mounting portion of the bracket is configured to mount at a mounting element for a license plate of the vehicle, and a sensor mounting portion of the bracket is angled with respect to the vehicle mounting portion such that the sensor mounting portion extends generally rearwardly when the bracket is fastened at the license plate mounting element. The imaging sensor generates a signal indicative of an image representative of a scene occurring within the field of view. The image processor receives the signal and processes the signal and generates an output signal representative of the imaged scene. The system may include a display, which may display at least one iconistic representation of at least one detected relevant object in response to an output signal generated by the image processor.

23 Claims, 4 Drawing Sheets

U.S. PATENT DOCUMENTS

| | | | |
|---|---|---|---|
| 5,535,314 A | 7/1996 | Alves et al. | 395/131 |
| 5,550,677 A | 8/1996 | Schofield et al. | 359/604 |
| 5,574,443 A * | 11/1996 | Hsieh | 340/901 |
| 5,648,835 A | 7/1997 | Uzawa | 396/429 |
| 5,668,663 A | 9/1997 | Varaprasad et al. | 359/608 |
| 5,670,935 A | 9/1997 | Schofield et al. | 340/461 |
| 5,680,123 A | 10/1997 | Lee | 340/937 |
| 5,724,187 A | 3/1998 | Varaprasad et al. | 359/608 |
| 5,760,828 A | 6/1998 | Cortes | 348/143 |
| 5,786,772 A | 7/1998 | Schofield et al. | 340/903 |
| 5,796,094 A | 8/1998 | Schofield et al. | 250/208.1 |
| 5,798,575 A | 8/1998 | O'Farrell et al. | 307/10.1 |
| 5,914,815 A | 6/1999 | Bos | 359/571 |
| 5,929,786 A | 7/1999 | Schofield et al. | 340/903 |
| 5,949,331 A | 9/1999 | Schofield et al. | 340/461 |
| 5,959,367 A | 9/1999 | O'Farrell et al. | 307/10.1 |
| 5,982,544 A | 11/1999 | Ogata | 359/565 |
| 6,097,023 A | 8/2000 | Schofield et al. | 250/208.1 |
| 6,100,795 A * | 8/2000 | Otterbacher et al. | 340/431 |
| 6,115,651 A | 9/2000 | Cruz | 701/1 |
| 6,175,164 B1 | 1/2001 | O'Farrell et al. | 307/10.1 |
| 6,175,300 B1 | 1/2001 | Kendrick | 340/436 |
| 6,198,409 B1 | 3/2001 | Schofield et al. | 340/903 |
| 6,201,642 B1 | 3/2001 | Bos | 359/565 |
| 6,222,447 B1 | 4/2001 | Schofield et al. | 340/461 |
| 6,313,454 B1 | 11/2001 | Bos et al. | 250/208.1 |
| 6,320,176 B1 | 11/2001 | Schofield et al. | 250/208.1 |
| 6,353,392 B1 | 3/2002 | Schofield et al. | 340/602 |
| 6,396,397 B1 | 5/2002 | Bos et al. | 340/461 |
| 6,429,789 B1 | 8/2002 | Kiridena et al. | |
| 6,446,999 B1 * | 9/2002 | Davis, Jr. | 280/477 |
| 6,590,719 B2 | 7/2003 | Bos | 359/753 |
| 6,592,230 B2 | 7/2003 | Dupay | |
| 6,654,670 B2 * | 11/2003 | Kakinami et al. | 701/1 |
| 2002/0003571 A1 | 1/2002 | Schofield et al. | 348/148 |
| 2002/0048086 A1 | 4/2002 | Bos | 359/566 |
| 2002/0159270 A1 | 10/2002 | Lynam et al. | 362/492 |

FOREIGN PATENT DOCUMENTS

| | | |
|---|---|---|
| DE | 3248511 A1 | 7/1984 |
| EP | 0416222 A2 | 3/1991 |
| EP | 0513476 A1 | 11/1992 |
| FR | 2241085 | 3/1975 |
| FR | 2585991 | 2/1987 |
| FR | 2673499 | 9/1992 |
| GB | 934037 | 8/1963 |
| GB | 2137573 A | 10/1984 |
| GB | 2244187 A | 11/1991 |
| GB | 2327823 A | 2/1999 |
| JP | 5539843 | 3/1980 |
| JP | 58209635 | 12/1983 |
| JP | 62122487 | 6/1987 |
| JP | 62122844 | 6/1987 |
| JP | 361192 | 3/1991 |
| JP | 3151829 | 1/1993 |
| WO | 9638319 | 12/1996 |

* cited by examiner

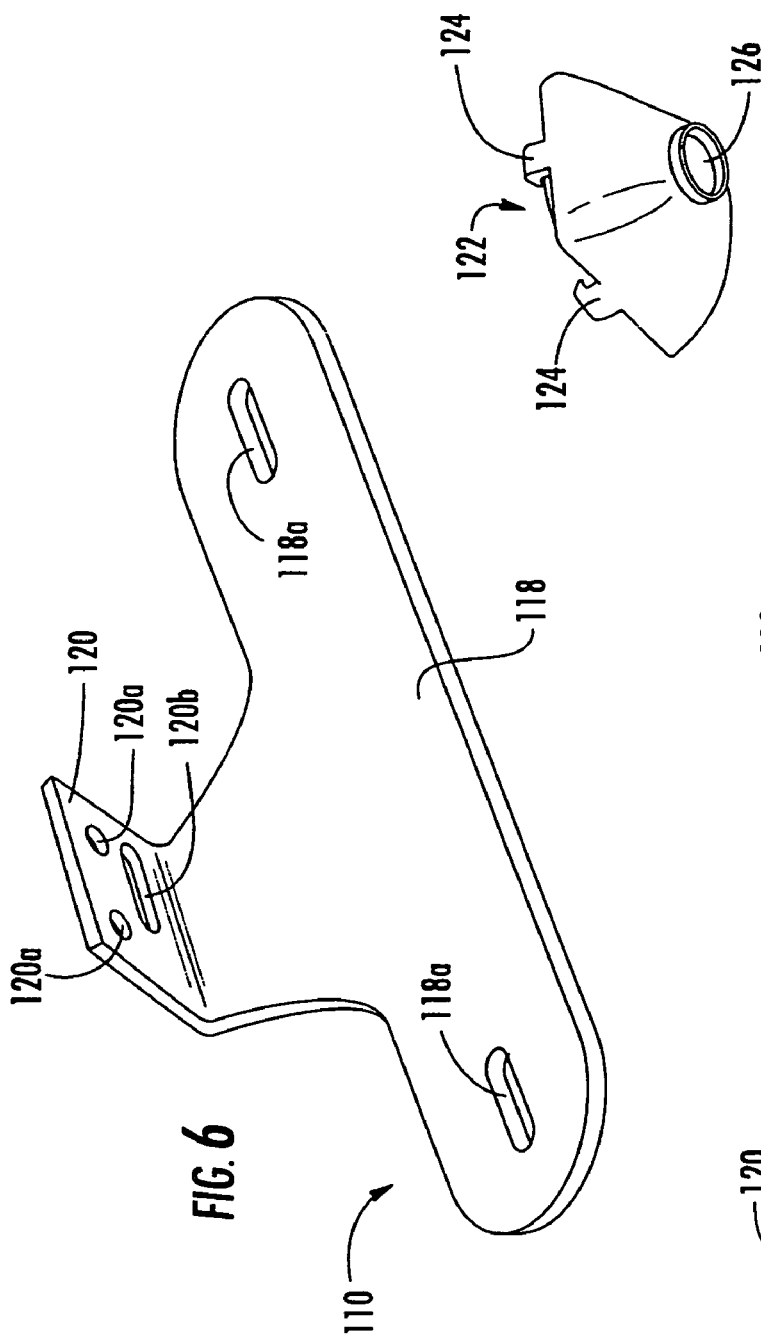
FIG. 6
FIG. 7
FIG. 8
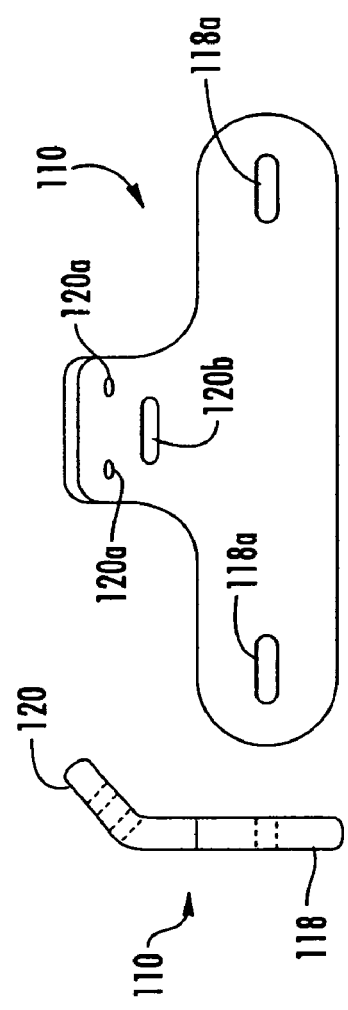
FIG. 9

VEHICLE IMAGING SYSTEM

CROSS REFERENCE TO RELATED APPLICATIONS

The present application is a continuation of U.S. patent application Ser. No. 10/418,486, filed Apr. 18, 2003 now U.S. Pat. No. 7,005,974, which claims priority of U.S. provisional applications, Ser. No. 60/373,932, filed Apr. 19, 2002 by McMahon for VEHICLE IMAGING SYSTEM; and Ser. No. 60/376,508, filed Apr. 30, 2002 by Bingle for VEHICLE LICENSE PLATE BRACKET, which are all hereby incorporated herein by reference in their entireties.

FIELD OF THE INVENTION

The present invention relates to a vehicle imaging system and, more particularly, to a vehicle imaging system useful for a backup or reverse aid to the driver of a vehicle. The present invention is also related to a bracket for mounting an imaging sensor at an exterior portion, such as a rearward portion, of a vehicle.

BACKGROUND OF THE INVENTION

It is known to provide an imaging system for a vehicle which functions to provide a rearward view of the vehicle to a driver via a display within the vehicle. Such systems function to assist a driver in backing up a vehicle to a trailer or otherwise positioning or parking the vehicle at a desired location. However, such systems include a display which is typically a video screen which may be expensive to manufacture and implement with the imaging system.

SUMMARY OF THE INVENTION

The present invention is intended to provide a low cost backup or reverse aid for a vehicle. The reverse aid provides a dot matrix type display which displays a simplified or iconistic representation of a vehicle bumper and/or other portion of the vehicle and any objects detected exteriorly of the vehicle. The present invention is also intended to provide a bracket for mounting an imaging sensor at an exterior or rearward portion of a vehicle in a manner which is not intrusive to the exterior or rearward portion of the vehicle.

According to an aspect of the present invention, a vehicle imaging system includes an imaging sensor, an image processing system or image processor and a display. The image processor may receive a signal or image from the imaging sensor and may process the signal to detect at least one relevant object, such as the vehicle bumper and/or any object or objects near or approaching the vehicle or the vehicle bumper. The image processor may provide for edge detection of an object or objects via an edge detection algorithm or the like. The detected objects are then represented as simple, line or iconistic representations on the display, which may be a low cost dot matrix type display or the like.

The present invention is especially suitable for use during a trailer hitching operation, where the vehicle is moved toward a trailer for connection thereto. In such operations, the driver cannot clearly view the hitch of the trailer as the vehicle is backing up. The display of the present invention provides a general representation of the hitch of the vehicle and the hitch of the trailer as lines in the display, whereby the driver may control or maneuver the vehicle to align the lines or icons with one another. Preferably, the imaging system of the present invention may provide an indication to the driver of the vehicle when the hitches are aligned, such as via flashing the lines or icons in the display or any other means for indicating the alignment to the driver.

According to another aspect of the present invention, a vehicle imaging system comprises an imaging sensor having a field of view, an image processor and a display. The imaging sensor is operable to generate a signal indicative of an image representative of a scene occurring within the field of view. The image processor processes the signal to detect at least one relevant object within the image. The image processor generates an output signal representative of the at least one detected relevant object. The output signal comprises at least one iconistic representation of the at least one detected relevant object. The display is operable to display the at least one iconistic representation of the at least one detected relevant object.

The display may comprise a dot matrix display. The image processor may provide edge detection of objects via an edge detection algorithm or the like. The display may then provide iconistic representations of the detected edges of the at least one relevant object within the image.

The imaging system may display at least one iconistic representation of an exterior vehicle portion, such as a trailer hitch of the vehicle, and at least one target object, such as the hitch of a trailer, as separate icons in the display. The display may provide an indication to the driver of the vehicle when the icons representing the vehicle portion and the target object are generally aligned. The display may provide such an indication via flashing the icons in the display.

The imaging system may be operable to determine a distance between the vehicle and the at least one detected relevant object. The imaging system may be operable to determine the distance in response to a speed at which the at least one detected relevant object moves across the image and a speed of the vehicle.

According to another aspect of the present invention, a method of aligning an exterior portion of a vehicle with a target object exteriorly of the vehicle comprises providing an imaging sensor having a field of view exteriorly of a vehicle and including an exterior portion of the vehicle and at least one target object exteriorly of the vehicle. The imaging sensor generates a signal indicative of an image representative of a scene occurring within the field of view exteriorly of the vehicle. An image processor is provided for processing the signal to detect the exterior portion of the vehicle and the target object within the image. The image processor generates an output signal representative of the exterior portion of the vehicle and the target object. The output signal comprises at least one iconistic representation of the exterior portion of the vehicle and the target object. The at least one iconistic representation of the exterior portion of the vehicle and the target object are displayed at a display. The vehicle is driven or maneuvered to align the at least one iconistic representation of the exterior portion of the vehicle in the display with the at least one iconistic representation of the target object in the display.

According to another aspect of the present invention, an imaging sensor bracket for mounting an imaging sensor to a vehicle includes a mounting portion adapted to be mounted to a license plate mounting hole on a vehicle and a sensor mounting portion extending from the vehicle mounting portion. The sensor mounting portion is angled with respect to the vehicle mounting portion of the bracket such that the sensor mounting portion extends generally rearwardly and generally horizontally when the vehicle mounting portion is fastened to the license plate mounting hole on the vehicle. The sensor mounting portion is adapted to mount or receive an imaging sensor thereon.

The imaging sensor may be an imaging array sensor and may be operable to receive an image of a scene occurring generally rearwardly of the vehicle. The imaging sensor bracket may include a cover which substantially contains the imaging sensor at the sensor mounting portion of the bracket. The cover may provide an opening through which the imaging sensor receives the image of the scene. The cover may be a plastic material and may snap onto the sensor mounting portion of the bracket to substantially enclose the imaging sensor within the cover.

The present invention thus provides an imaging system which is operable to analyze an image of a scene exteriorly of the vehicle and to extract from the sensor or camera the relevant portions of the image. The portions are then displayed as iconistic representations of the objects or portions of the scene, such as simple lines or icons in a dot matrix type display within the vehicle. The driver of the vehicle may view the iconistic representations on the display and control the vehicle accordingly, such as to avoid an object or to align an object, such as a trailer, with the vehicle.

These and other objects, advantages, purposes and features of the present invention will become apparent upon review of the following specification in conjunction with the drawings.

BRIEF DESCRIPTION OF THE DRAWINGS

FIG. 6 is a perspective view of an imaging sensor bracket in accordance with the present invention;

FIG. 7 is a rear elevation of the imaging sensor bracket of FIG. 6;

FIG. 8 is a side elevation of the imaging sensor bracket of FIGS. 6 and 7; and

FIG. 9 is a perspective view of a cover useful with the imaging sensor bracket of the present invention.

DESCRIPTION OF THE PREFERRED EMBODIMENTS

Figure 1:
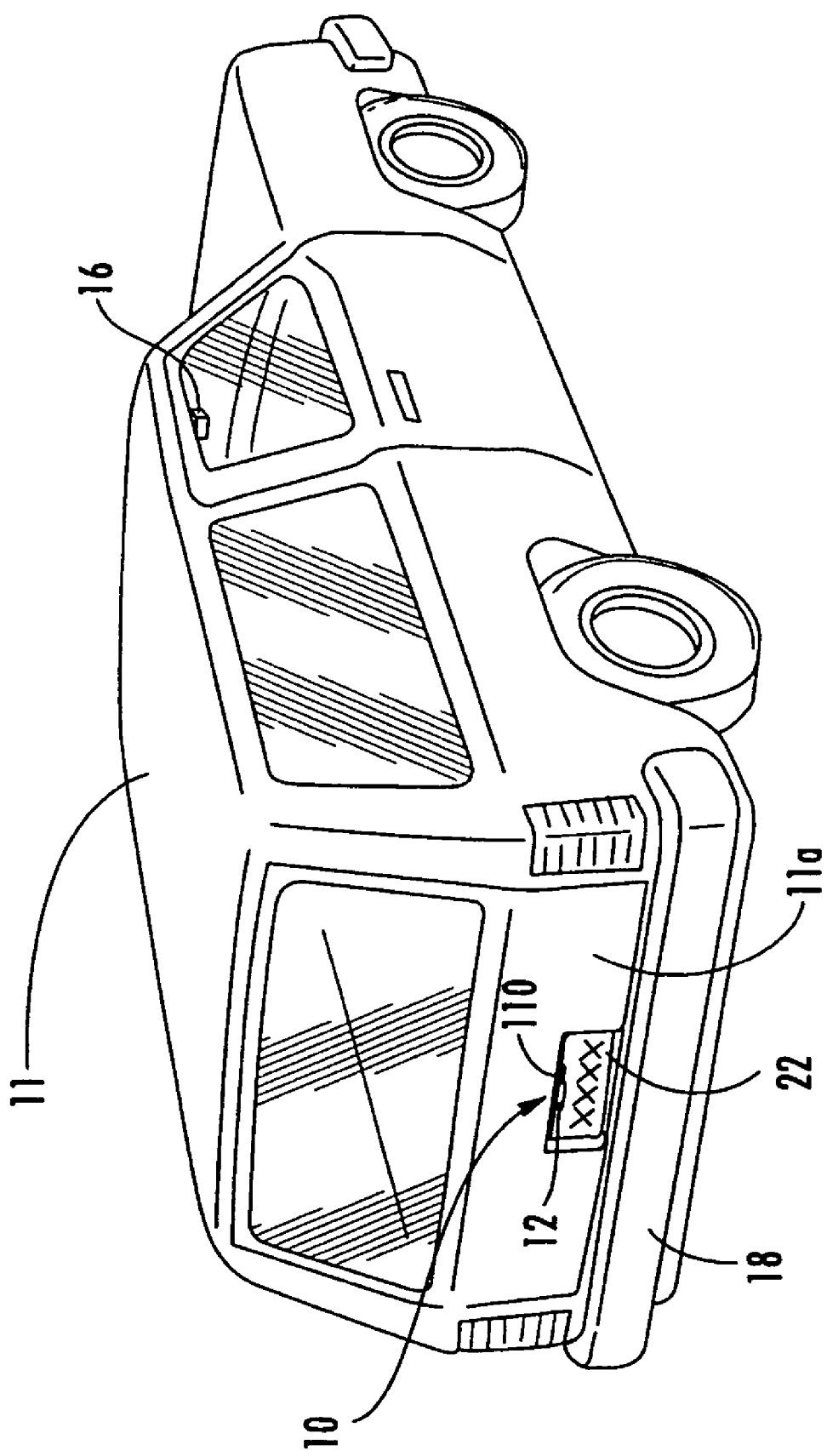
FIG. 1 is a rear perspective view of a vehicle with an imaging system in accordance with the present invention mounted thereon.
Figure 2:
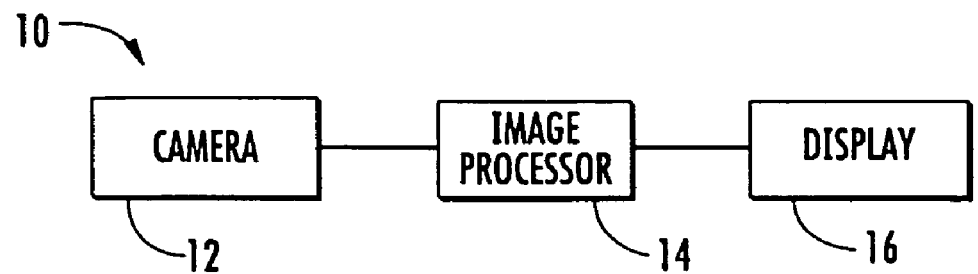
FIG. 2 is a block diagram of the imaging system of the present invention.

Referring now to the drawings and the illustrative embodiments depicted therein, a vehicle imaging system 10 includes an image sensor or camera 12, an image processing system or image processor 14 and a display 16 (FIGS. 1 and 2). The image processing system 14 receives an input or signal from a single camera or multiple cameras positioned at a portion of a vehicle 11, such as at an exterior portion of the vehicle, such as at a rearward exterior portion 11a of the vehicle 11. The camera 12 is operable to capture an image of a scene exteriorly, and preferably rearwardly, of the vehicle. The camera may be any known camera or image sensor, such as an imaging array sensor, such as a CMOS sensor or CCD sensor, such as described in commonly assigned U.S. Pat. Nos. 5,550,677; 6,097,023 and 5,796,094, which are hereby incorporated herein by reference. The image processing system is operable to process the image or signal received from the camera. The display is then operable to display or show an iconistic representation or an outline or line representation of the vehicle's bumper and an iconistic representation or an outline or line representation of any object or objects or obstacles detected by the image processing system.

Optionally, the image processing system may process the image with an edge detection algorithm or process. Using an edge detection algorithm or process allows for differentiation between oil spots and three dimensional objects (including pot holes), as discussed below. Examples of such edge detection algorithms are disclosed in commonly assigned U.S. Pat. Nos. 6,313,454 and 6,353,392, which are hereby incorporated herein by reference.

Optionally, the display may comprise a multi-pixel, dot matrix type of display, such as a VF display or the like. Such a display may provide a low cost display which provides a representation of the objects, but does not include additional details which are not necessary or important to the driver when backing up or otherwise controlling or maneuvering the vehicle.

Figure 3:
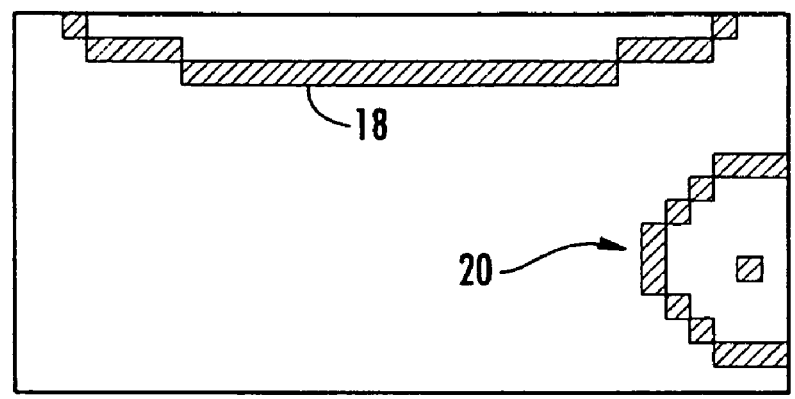
FIG. 3 is an example of an image displayed on a display suitable for use with the imaging system of the present invention.

An example of the iconistic representation of a scene or image as shown on the display 16 of imaging system 10 is shown in FIG. 3. An iconistic or line representation 18 of the vehicle's bumper is shown at the top portion of the display screen and an iconistic or line representation 20 of an object or obstacle is shown at the lower right of the display screen.

Figure 4A:
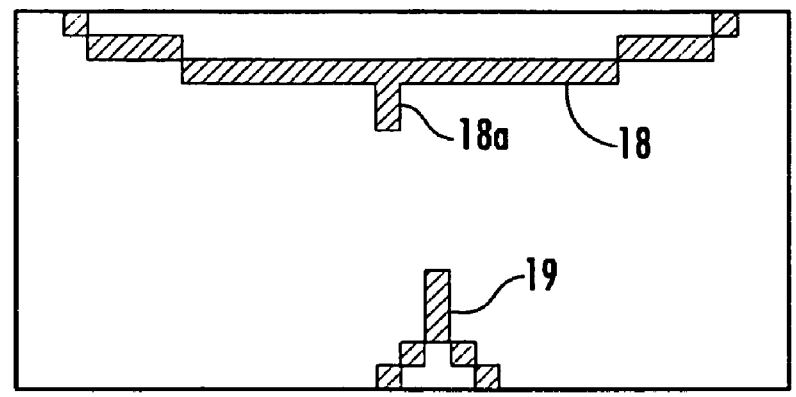
FIGS. 4A and 4B are examples of images displayed on the display as the vehicle approaches a trailer during a hitching operation.
Figure 4B:
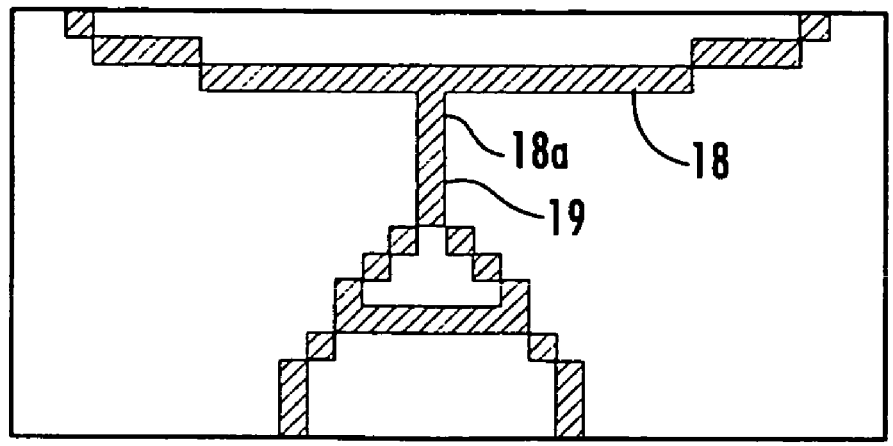

As shown in FIGS. 4A and 4B, for trailer hitching processes or situations, the vehicle's hitch may be shown as a simple line or iconistic representation 18a extending rearwardly from the bumper representation 18 of the vehicle, while the trailer's hitch or tongue may be shown as another line or iconistic representation 19 extending from the trailer. As shown in FIG. 4A, the hitches, and thus the iconistic representations 18a, 19 of the hitches, may not be aligned as the vehicle approaches the trailer.

As the vehicle moves closer to the trailer hitch, the icons or lines 18a, 19 approach one another on the display. The driver may steer or drive or maneuver the vehicle to generally align the icons or lines or outlines representative of the hitches. When the vehicle is in or is approaching the right area or spot for hitching or connecting to the trailer hitch, the display may flash the lines or otherwise indicate that the two icons or lines are aligned to indicate that the hitches are at least generally aligned. FIG. 4B shows the icons 18a, 19 as being aligned, thereby indicating that the hitches are at least generally aligned and in or near the hitch position. At this point the display may flash one or both iconistic representations or otherwise indicate alignment of the hitches to the driver of the vehicle.

Figure 5:
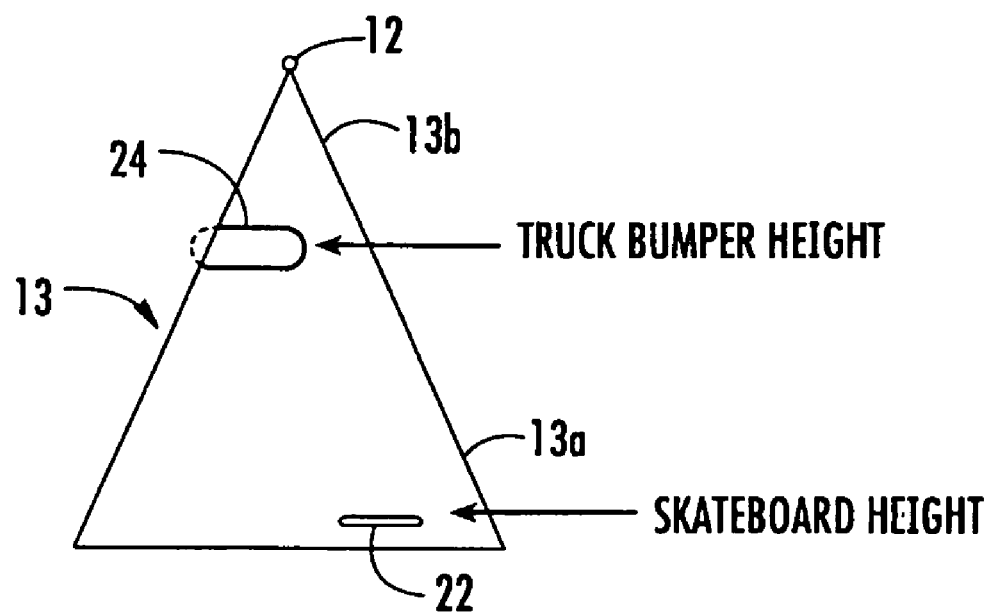
FIG. 5 depicts a cone of sight or field of view of an image sensor useful with the imaging system of the present invention.

The imaging system of the present invention may also provide for a distance measurement between objects and the vehicle. The distance from the vehicle to a detected object may be determined using a combination of vehicle speed and motion of the object through the sensor range or field of view. To determine the height of an object or distance between the sensor and the object once the object is detected, the system may determine how quickly the object moves through the sensor range or field of view as compared to the speed of the vehicle. An object on or near the ground will be at or near the widest part 13a of a cone or field of sight or view 13 of sensor or camera 12 (FIG. 5), whereas a higher object will be at a narrower part or upper portion 13b of the cone or field of sight or view 13. When a stationary object (such as, for example, a skateboard 22 or the like, such as shown in FIG. 5) is on the ground, the leading edge of the object will move more slowly through the sensor range (as the vehicle is moved) than the edge of another object that is a few feet above the ground (such as the bumper of a truck 24). The imaging system of the present invention may then be operable to determine or calculate a height of the detected object in response to the speed of the vehicle and the speed at which the object moves through the range of the sensor or camera. The imaging system may thus determine the distance from the vehicle or from the sensor to the detected object based on the height determination of the object and location of the object within the captured image. The imaging system may then indicate the distance to the driver of the vehicle and may indicate a warning or alert if the distance is within a threshold distance.

Therefore, the present invention provides a camera or image sensor, an image processing system or device and a display (such as a simple dot matrix display, which may be a display-on-demand type of display) for a back up or reversing aid or trailer hitching aid for a vehicle, or for any other vehicle vision system. The display may be part of an interior rearview mirror assembly, and may include a display-on-demand (DOD) type of display (such as disclosed in commonly assigned U.S. patent application Ser. No. 10/054,633, filed Jan. 22, 2002 by Lynam et al. for VEHICULAR LIGHTING SYSTEM, and/or in commonly assigned U.S. patent application Ser. No. 09/793,002, entitled VIDEO MIRROR SYSTEMS INCORPORATING AN ACCESSORY MODULE, filed Feb. 26, 2001, now U.S. Pat. No. 6,690,268, and/or in commonly assigned U.S. Pat. Nos. 5,668,663 and 5,724,187, which are all hereby incorporated by reference herein), which may comprise two displays located in the mirror assembly.

The imaging system of the present invention may be suitable for use with other imaging systems of the vehicle or may utilize principles or aspects of such other systems, such as a video mirror system, such as disclosed in commonly assigned U.S. patent application Ser. No. 09/793,002, filed on Feb. 26, 2001 by Schofield et al., entitled VIDEO MIRROR INCORPORATING AN ACCESSORY MODULE, now U.S. Pat. No. 6,690,268; and Ser. No. 09/585,379, filed Jun. 1, 2000 for REARVIEW MIRROR ASSEMBLY WITH UTILITY FUNCTIONS, which are hereby incorporated herein by reference, or an exterior imaging system, such as a rear vision system utilizing a mirror mounted or vehicle mounted camera, such as disclosed in commonly assigned U.S. Pat. Nos. 5,959,367; 5,929,786; 5,949,331; 5,914,815; 5,786,772; 5,798,575; 5,670,935; 6,175,164; 6,198,409; 6,201,642 and/or 6,222,447, and/or in commonly assigned U.S. patent application Ser. No. 09/199,907, filed Nov. 25, 1998, entitled WIDE ANGLE IMAGE CAPTURE SYSTEM FOR VEHICLES, now U.S. Pat. No. 6,717,610; Ser. No. 10/010,862, filed Dec. 6, 2001, entitled PLASTIC LENS SYSTEM FOR VEHICLE IMAGING SYSTEM, now U.S. Pat. No. 6,757,109, and/or Ser. No. 09/372,915, filed Aug. 12, 1999, entitled VEHICLE IMAGING SYSTEM WITH STEREO IMAGING, now U.S. Pat. No. 6,396,397, which are all hereby incorporated herein by reference in their entireties.

Although shown and described as being suitable for viewing and displaying images representative of a scene occurring exteriorly of the vehicle, such as rearwardly of the vehicle, it is envisioned that the imaging system of the present invention may be equally suitable for use as an interior imaging system for viewing and displaying images representative of scenes occurring interiorly of the vehicle. For example, the imaging system may capture images of scenes occurring within the cabin of the vehicle or within the trunk compartment or other interior compartment of the vehicle or the like, and may display iconistic representations of occupants and/or objects within the cabin or trunk of the vehicle.

Referring now to FIGS. 6–8, a mounting bracket 110 for imaging sensor 12 is mountable at the license plate mounting area 22 of vehicle 11. As shown in FIGS. 6–8, mounting bracket 110 includes a vehicle mounting portion or flange 118 and an imaging sensor mounting portion or flange 120. Mounting bracket 110 may comprise a metal or plastic bracket. Mounting bracket 110 provides a generally centrally located mounting area for imaging sensor 12 which does not require modification of the rear portion or panel 11a of vehicle 11.

Vehicle mounting portion 118 is a generally flat or planar plate with at least one mounting hole 118a therethrough. The mounting hole 118a is adapted to receive a license plate mounting fastener therethrough to retain mounting bracket 110 to the vehicle 11. Vehicle mounting portion 118 may include a pair of mounting holes 118a at opposite ends of the vehicle mounting portion for securing the bracket 110 to the vehicle by both of the license plate fasteners of the vehicle 11.

Imaging sensor mounting portion 120 extends from vehicle mounting portion 118, such as upwardly and generally rearwardly form vehicle mounting portion 118 when vehicle mounting portion 118 is mounted to the vehicle. In the illustrated embodiment, sensor mounting portion 120 includes a pair of fastening openings 120a for mounting or receiving imaging sensor 12. The imaging sensor 12 may be mounted to sensor mounting portion 120 via any fastening means, such as screws, bolts, tape (whereby the fastening openings may not be necessary) or the like, without affecting the scope of the present invention. Sensor mounting portion 120 may also include a passageway 120b for the vehicle wiring harness to pass through to provide power and control to the imaging sensor 12. The angle at which sensor mounting portion 120 extends from vehicle mounting portion 118 may be selected depending on the particular vehicle, the type of imaging system associated with the imaging sensor, and/or the desired viewing angle of the imaging sensor.

As shown in FIG. 9, a cosmetic cover 122 may be provided which snaps on or is otherwise secured to sensor mounting portion 120 to substantially encase or contain the imaging sensor 12. For example, cover 122 may include a plurality of flexible tabs 124 which may snap around the perimeter edges of the sensor mounting portion 120 (or which may snap within or through slots or the like in the sensor mounting portion) to retain cover 122 to the sensor mounting portion 120 of mounting bracket 110. Cover 122 includes an aperture or opening 126 through which the imaging sensor 12 receives the image of the rearward scene. Cover 122 provides an improved appearance to the bracket and imaging sensor and may provide additional protection to the imaging sensor by reducing the exposure of the imaging sensor to adverse weather conditions or impact with objects or the like. However, because the license plate mounting areas of most vehicles is a recessed area at a rear (or front) portion of the vehicle, the imaging sensor is already positioned in an area where it is substantially protected from exposure and impact.

Mounting bracket 110 may thus be mounted to an existing vehicle, such as an aftermarket installation, by removing the license plate fasteners, placing the vehicle mounting portion 118 at the vehicle so as to align the mounting holes 118*a* with the threaded holes in the license plate mounting area 22 of the vehicle 11, and then inserting the license plate fasteners through the license plate holes and the mounting holes 118*a* and securing the fasteners back into their threaded holes at the license plate mounting area of the vehicle. Preferably, the mounting holes 118*a* are slotted to ease alignment with the threaded holes at the license plate mounting area of the vehicle. The mounting portion 118 of mounting bracket 110 may be placed between the license plate mounting area of the vehicle and the license plate of the vehicle, such that the mounting portion 118 is not visible or noticeable. The sensor mounting portion 120 may extend generally rearwardly from the mounting portion 118 to position the imaging sensor 12 immediately rearward of the license plate of the vehicle and generally above or at an upper region of the license plate.

The imaging sensor mounted to bracket 110 may comprise an imaging array sensor, such as a CMOS sensor or a CCD sensor or the like, such as disclosed in commonly assigned U.S. Pat. Nos. 5,550,677; 5,670,935; and 5,796,094, which are hereby incorporated herein by reference. Because the mounting bracket of the present invention may provide a central mounting position of the imaging sensor, the imaging sensor mounted to the mounting bracket may be particularly suitable for use in rearward vision systems, such as reverse or backup aids, such as the imaging system 10 described above, or such as other imaging or vision systems utilizing the principles disclosed in U.S. Pat. Nos. 5,550,677; 5,670,935; and 6,201,642, and/or in U.S. patent application Ser. No. 09/199,907, filed Nov. 25, 1998 by Bos et al. for WIDE ANGLE IMAGE CAPTURE SYSTEM FOR VEHICLE, now U.S. Pat. No. 6,717,610, and/or in U.S. provisional application Ser. No. 60/373,972, filed Apr. 19, 2002 by McMahon for VEHICLE IMAGING SYSTEM, which are all hereby incorporated herein by reference. However, the imaging sensor may be implemented and operated in connection with various other vehicular systems, such as a forwardly directed vehicle vision system (if the mounting bracket is mounted at a forward license plate mounting area), a lane departure warning system, a system for determining a distance to a trailing (or leading) vehicle or object, such as using the principles disclosed in U.S. patent application Ser. No. 09/372,915, filed Aug. 12, 1999 by Bos et al. for VEHICLE IMAGING SYSTEM WITH STEREO IMAGING, now U.S. Pat. No. 6,396,397, which is hereby incorporated herein by reference, a rain sensor, such as the types disclosed in commonly assigned U.S. Pat. Nos. 6,353,392; 6,313,454; and/or 6,320,176, which are hereby incorporated herein by reference, and/or the like, without affecting the scope of the present invention.

Therefore, the mounting bracket of the present invention provides for a generally concealed mount for an imaging sensor, without requiring any modification to the structure of the vehicle. The mounting bracket of the present invention may simply mount to the vehicle by removing the existing license plate, placing the bracket over the license plate mounting hole pattern, placing the license plate over the bracket and screwing the plate screws back into the license plate mounting holes. The imaging sensor or camera is mounted on the upper flange or portion of the bracket by screws, mounting tape or other mounting methods. The angle of the flange can be adjusted to meet the specific needs of the vehicle and/or vision system.

The present invention thus may provide a supplemental mounting scheme for vehicles that are being retrofitted with a reverse aid, tow check or other camera system. The mounting bracket thus may provide a suitable or optimal mounting position for an imaging sensor for installations on vehicles which do not have a location available on the vehicle that is suitable for mounting a camera which will perform as expected.

Because most camera or imaging systems or applications require the camera to be mounted on the vehicle centerline for optimum camera functionality, the mounting bracket of the present invention provides a mounting location on the centerline for desired results, even on vehicles that may not have space available on or at or near the vehicle center to mount a camera. By mounting the bracket partially behind the license plate, the present invention provides a mostly hidden bracket/image sensor assembly, which also hides the wire harness which may be routed out from behind the license plate. The mounting bracket of the present invention also eliminates the need to drill holes in the sheet metal of the vehicle, which is important, since most people are not comfortable drilling holes or having holes drilled in their vehicle. A cosmetic cover can be applied for an even more clean and appealing appearance to the image sensor of the camera system of the vehicle.

Changes and modifications in the specifically described embodiments may be carried out without departing from the principles of the present invention, which is intended to be limited only by the scope of the appended claims, as interpreted according to the principles of patent law.

The embodiments of the invention in which an exclusive property or privilege is claimed are defined as follows:

1. A vehicle imaging system for a vehicle, the vehicle having a license plate mounting portion at a rear portion of the vehicle, said vehicle imaging system comprising:

an imaging sensor having a field of view;

an imaging sensor bracket for mounting said imaging sensor to the vehicle, said imaging sensor bracket comprising a vehicle mounting portion and a sensor mounting portion extending from said vehicle mounting portion;

said vehicle mounting portion being configured to be mounted at a mounting element for a license plate at the license plate mounting portion of the vehicle;

said sensor mounting portion being angled with respect to said vehicle mounting portion such that said sensor mounting portion extends generally rearwardly when said vehicle mounting portion is fastened at the license plate mounting element on the vehicle;

said imaging sensor being disposed at said sensor mounting portion so as to have a generally downward and rearward field of view exterior of the vehicle, said imaging sensor generating a signal indicative of an image representative of a scene occurring within the generally downward and rearward field of view;

an image processor processing said signal and generating an output signal representative of the imaged scene; and a display operable to display information in response to said output signal of said image processor.

2. The vehicle imaging system of claim 1, wherein said imaging sensor bracket includes a cover element which substantially contains said imaging sensor at said sensor mounting portion of said imaging sensor bracket.

3. The vehicle imaging system of claim 2, wherein said cover element provides an aperture through which said imaging sensor receives light representative of the exterior scene.

4. The vehicle imaging system of claim 1, wherein said sensor mounting portion extends generally rearwardly and generally horizontally when said vehicle mounting portion is fastened at the license plate mounting element on the vehicle.

5. The vehicle imaging system of claim 1, wherein said mounting portion is mounted to a generally vertical panel of the vehicle.

6. The vehicle imaging system of claim 5, wherein said mounting portion is mounted to a generally vertical panel of the vehicle that is recessed at the rear portion of the vehicle, said sensor mounting portion being positioned at an upper region of the recessed panel of the vehicle.

7. The vehicle imaging system of claim 1, wherein said output signal comprises at least one iconistic representation of at least one detected object in the scene.

8. The vehicle imaging system of claim 1, wherein said rearward field of view includes a trailer hitch of the vehicle.

9. The vehicle imaging system of claim 8, wherein said display provides at least one iconistic representation of the trailer hitch of the vehicle and at least one iconistic representation of a hitch of a trailer positioned generally rearward of the vehicle.

10. The vehicle imaging system of claim 9, wherein said at least one iconistic representation of the trailer hitch of the vehicle and said at least one iconistic representation of the hitch of the trailer are displayed as separate icons in said display.

11. The vehicle imaging system of claim 10, wherein said display provides an indication to the driver of the vehicle when the icons representing the trailer hitch of the vehicle and the hitch of the trailer are generally aligned.

12. A vehicle imaging system for a vehicle, the vehicle having a license plate mounting portion at a rear portion of the vehicle, said vehicle imaging system comprising:
   an imaging sensor having a field of view;
   an imaging sensor bracket for mounting said imaging sensor to the vehicle, said imaging sensor bracket comprising a vehicle mounting portion and a sensor mounting portion extending from said vehicle mounting portion;
   said vehicle mounting portion being configured to be mounted at a mounting element for a license plate at the license plate mounting portion of the vehicle;
   said sensor mounting portion being angled with respect to said vehicle mounting portion such that said sensor mounting portion extends generally rearwardly when said vehicle mounting portion is fastened at the license plate mounting element on the vehicle;
   said imaging sensor bracket includes a cover element which substantially contains said imaging sensor at said sensor mounting portion of said imaging sensor bracket, said cover element providing an opening through which said imaging sensor receives light representative of the exterior scene;
   said imaging sensor being disposed at said sensor mounting portion so as to have a generally downward and rearward field of view through said opening and exterior of the vehicle, said imaging sensor generating a signal indicative of an image representative of a scene occurring within the generally downward and rearward field of view; and
   an image processor processing said signal and generating an output signal representative of the imaged scene.

13. The vehicle imaging system of claim 12, wherein said sensor mounting portion extends generally rearwardly and generally horizontally when said vehicle mounting portion is fastened at the license plate mounting element on the vehicle.

14. The vehicle imaging system of claim 12, wherein said mounting portion is mounted to a generally vertical panel of the vehicle.

15. The vehicle imaging system of claim 14, wherein said mounting portion is mounted to a generally vertical panel of the vehicle that is recessed at the rear portion of the vehicle, said sensor mounting portion being positioned at an upper region of the recessed panel of the vehicle.

16. The vehicle imaging system of claim 12, wherein said field of view encompasses a trailer hitch of the vehicle.

17. The vehicle imaging system of claim 12, wherein said output signal comprises at least one iconistic representation of at least one detected object in the scene.

18. The vehicle imaging system of claim 12 including a display operable to display information in response to said output signal of said image processor.

19. A vehicle imaging system for a vehicle, the vehicle having a generally vertically oriented license plate mounting portion at a rear portion of the vehicle, said vehicle imaging system comprising:
   an imaging sensor having a field of view;
   an imaging sensor bracket for mounting said imaging sensor to the vehicle, said imaging sensor bracket comprising a vehicle mounting portion and a sensor mounting portion extending from said vehicle mounting portion;
   said vehicle mounting portion being configured to be mounted at a mounting element for a license plate at the generally vertical license plate mounting portion of the vehicle;
   said sensor mounting portion being angled with respect to said vehicle mounting portion such that said sensor mounting portion extends generally rearwardly and generally horizontally when said vehicle mounting portion is fastened at the license plate mounting element on the vehicle;
   said imaging sensor being disposed at said sensor mounting portion so as to have a generally downward and rearward field of view exterior of the vehicle, said field of view including a trailer hitch of the vehicle, said imaging sensor generating a signal indicative of an image representative of a scene occurring within the generally downward and rearward field of view; and
   an image processor processing said signal and generating an output signal representative of the imaged scene.

20. The vehicle imaging system of claim 19, wherein said output signal comprises at least one iconistic representation of at least one detected object in the scene.

21. The vehicle imaging system of claim 19 including a display operable to display information in response to said output signal of said image processor.

22. The vehicle imaging system of claim 21, wherein said display provides at least one iconistic representation of the trailer hitch of the vehicle and at least one iconistic representation of a hitch of a trailer positioned generally rearward of the vehicle.

23. The vehicle imaging system of claim 19, wherein said imaging sensor bracket includes a cover element which substantially contains said imaging sensor at said sensor mounting portion of said imaging sensor bracket, said cover element providing an aperture through which said imaging sensor receives light representative of the exterior scene.

* * * * *